United States Patent [19]
Collins

[11] 3,973,931
[45] Aug. 10, 1976

[54] AIR SEPARATION BY ADSORPTION

[75] Inventor: John Joseph Collins, Katonah, N.Y.

[73] Assignee: Union Carbide Corporation, New York, N.Y.

[22] Filed: Oct. 7, 1975

[21] Appl. No.: 620,341

Related U.S. Application Data

[63] Continuation of Ser. No. 519,267, Oct. 30, 1974, abandoned.

[52] U.S. Cl. .................................. 55/58; 55/62; 55/68
[51] Int. Cl.² ............................................ B01D 53/04
[58] Field of Search .......... 55/23, 24, 25, 58, 62, 55/68, 20, 75, 208

[56] References Cited
UNITED STATES PATENTS

| | | |
|---|---|---|
| 3,069,830 | 12/1962 | Skarstrom et al. ................ 55/58 |
| 3,140,933 | 7/1964 | McKee ............................... 55/68 |
| 3,313,091 | 4/1967 | Berlin ................................. 55/58 |
| 3,323,288 | 6/1967 | Cheung et al. ..................... 55/58 |
| 3,738,084 | 6/1973 | Simonet et al. ................ 55/62 X |
| 3,738,087 | 6/1973 | McCombs .......................... 55/58 |
| 3,800,507 | 4/1974 | Howell et al. ................. 55/62 X |
| 3,923,477 | 12/1975 | Armond et al. ................... 55/68 |

*Primary Examiner*—John Adee
*Attorney, Agent, or Firm*—John C. LeFever

[57] ABSTRACT

In an adiabatic pressure swing process for air separation by selective adsorption in at least two zeolitic molecular sieve beds in which air is introduced at below 90°F, the coldest gas temperature in the inlet end is 35°F and the ΔT at least 15°F, the inlet end is heated to maintain the gas at maximum of at least 20°F warmer than without heating, but below 175°F.

12 Claims, 12 Drawing Figures

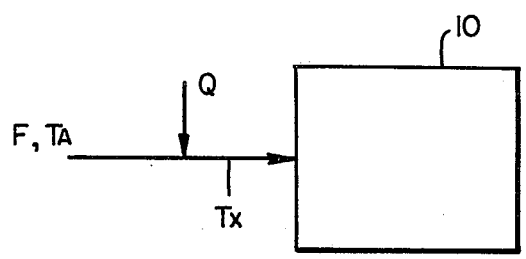
F I G. 3
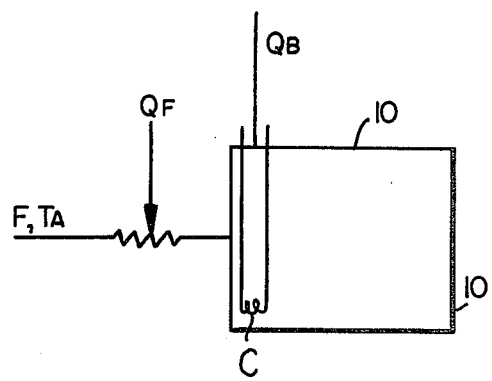
F I G. 3C
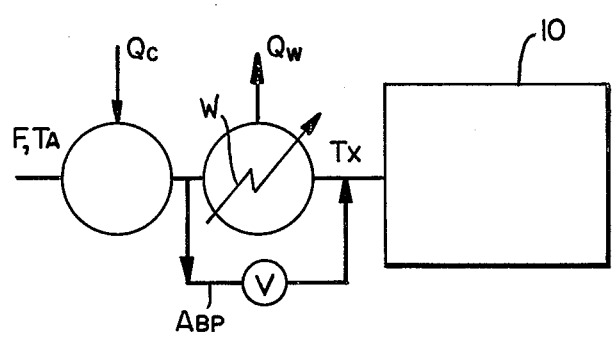
F I G. 3A
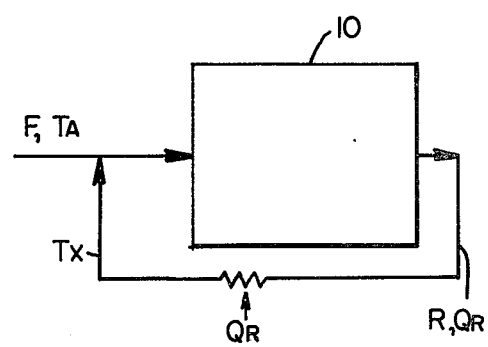
F I G. 3D
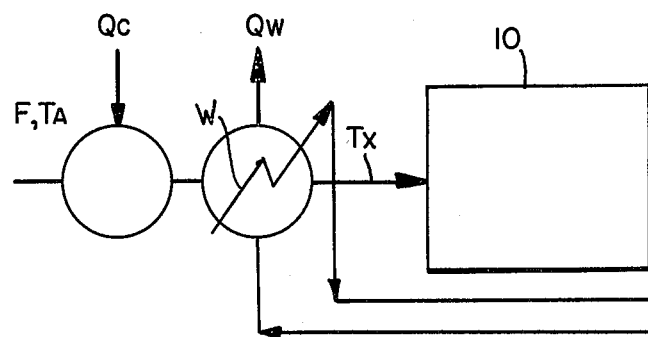
F I G. 3B

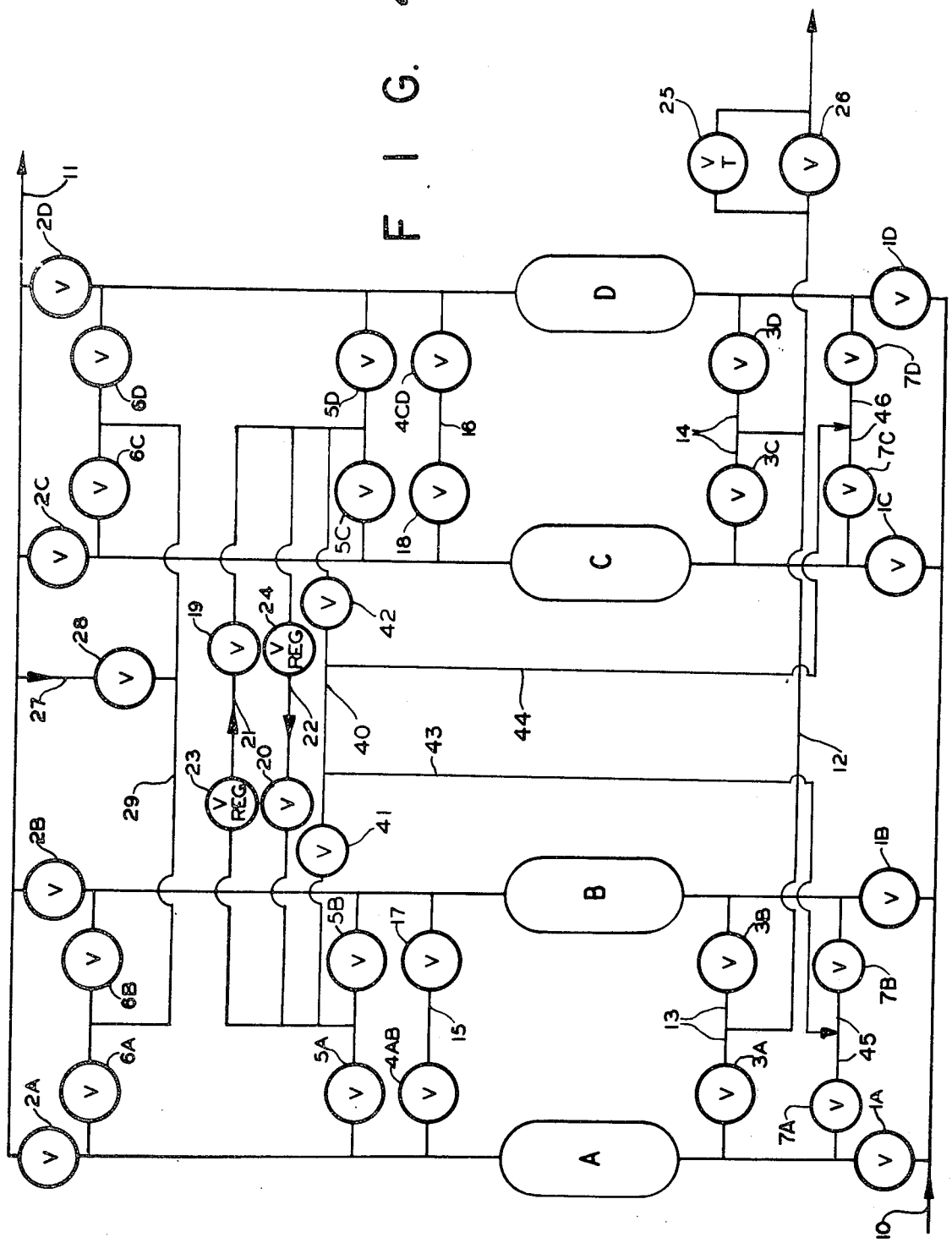

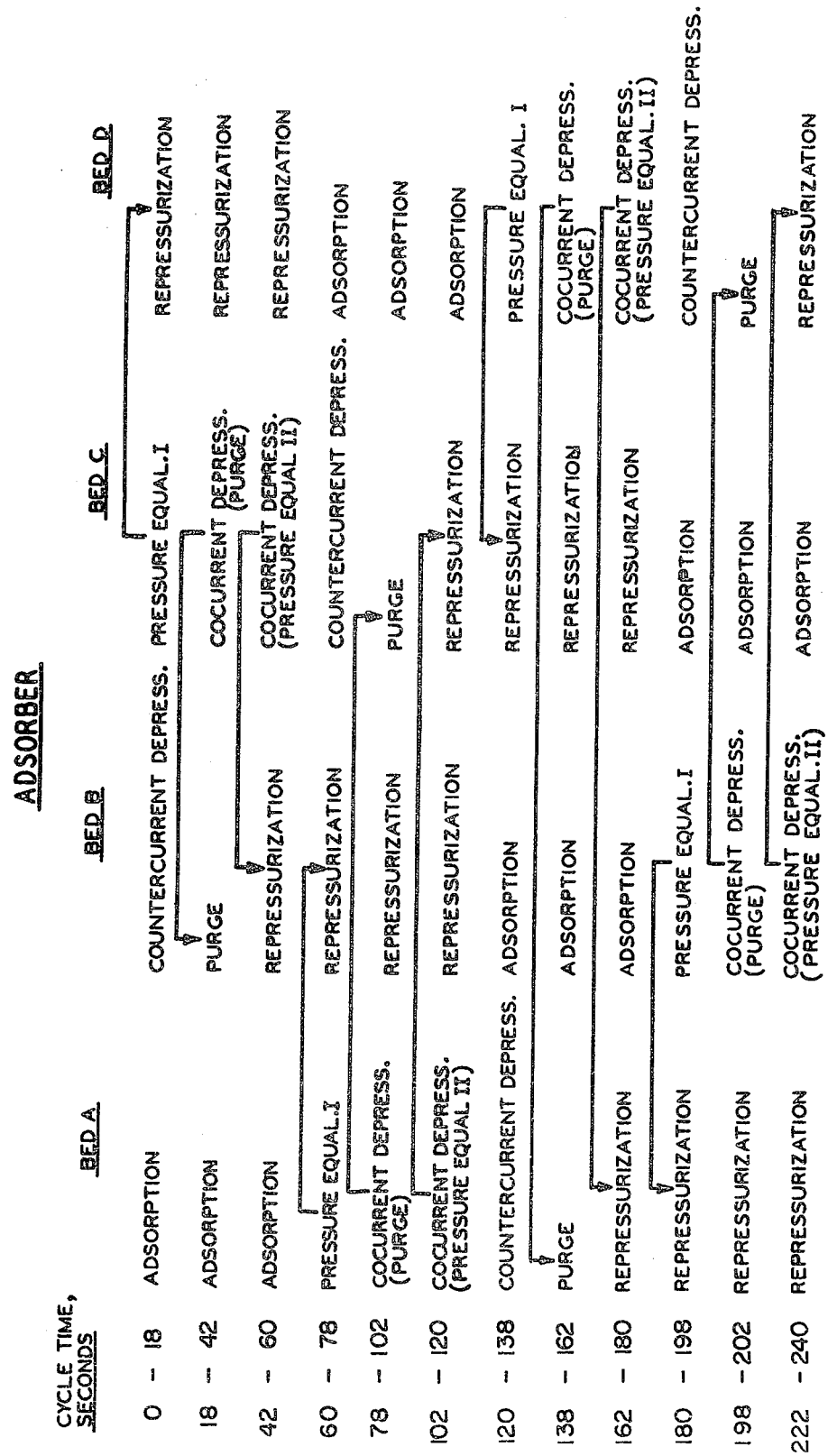

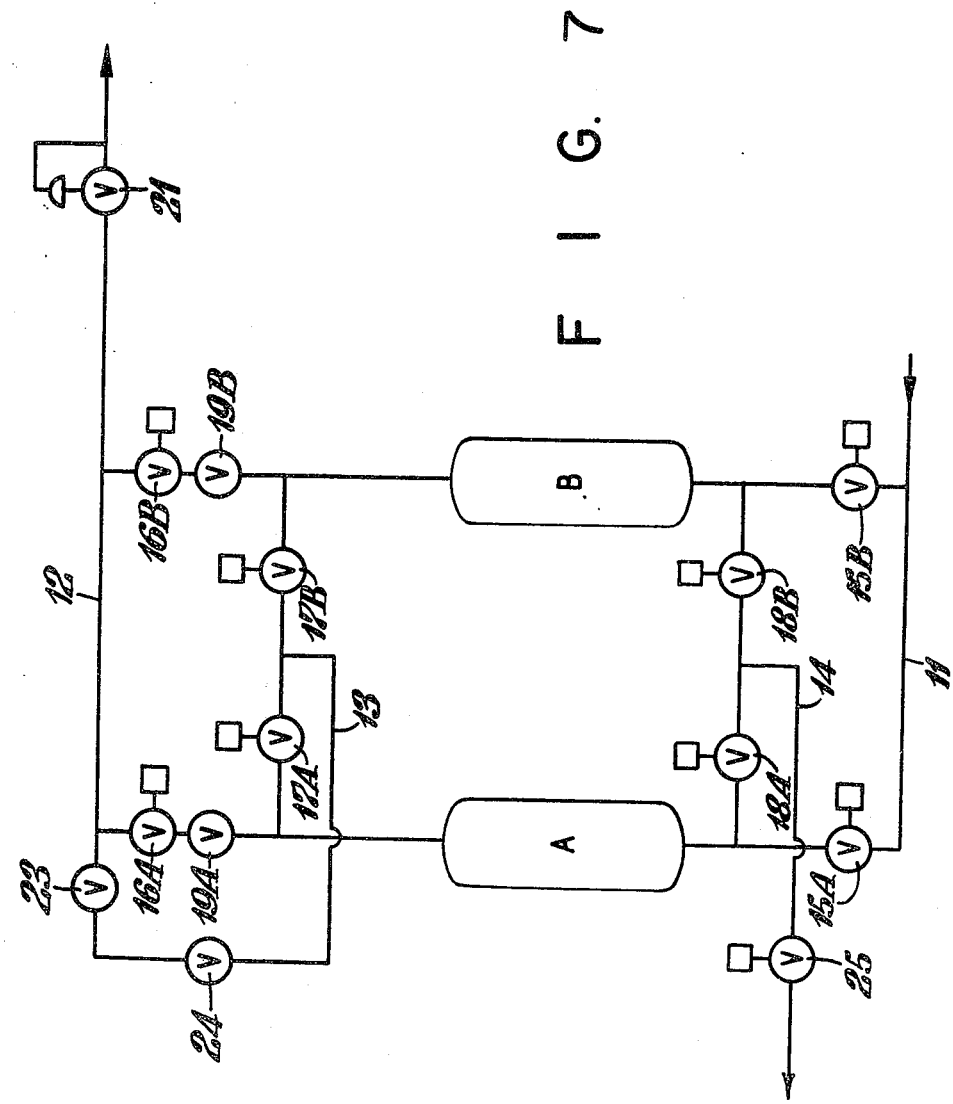

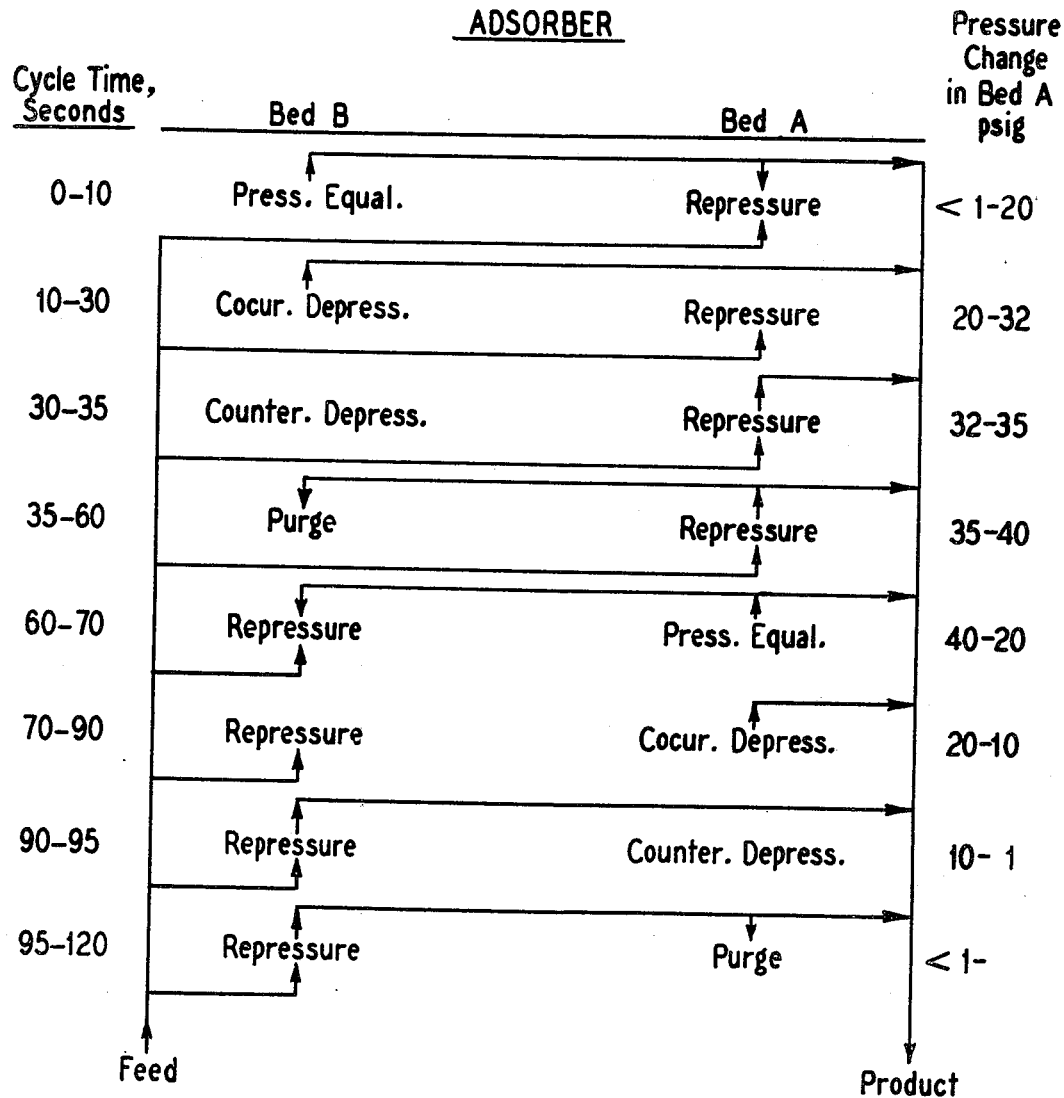

AIR SEPARATION BY ADSORPTION

RELATED APPLICATION

This application is a continuation of application Ser. No. 519,267 filed Oct. 30, 1974 entitled "Air Separation by Adsorption" now abandoned.

BACKGROUND OF THE INVENTION

This invention relates to a process for separating air by adiabatic pressure swing adsorption.

In the prior art adiabatic pressure swing processes for air separation, the cycle sequence usually includes a selective adsorption step during which compressed air is introduced at the adsorbent bed inlet end thereby forming a nitrogen adsorption front, nitrogen being selectively adsorbed by most adsorbents as for example, zeolitic molecular sieves. Oxygen is also coadsorbed but substantially displaced by the more strongly held nitrogen adsorbate. Oxygen effluent gas is discharged from the opposite or discharge end of the bed at about the feed air pressure and the nitrogen adsorption front moves progressively toward the discharge end. The adsorption step is terminated when the front is intermediate the inlet and discharge ends, and the bed is cocurrently depressurized with oxygen effluent being released from the discharge end and the nitrogen adsorption front moving into the previously unloaded section closer to the discharge end. The cocurrent depressurization gas may in part be discharged as oxygen product and in part returned to other adsorbent beds for a variety of purposes, e.g. purging and pressure equilization with a purged bed for partial repressurization thereof. Cocurrent depressurization is terminated before the front reaches the discharge end so that the oxygen purity of the effluent is nearly that of the gas discharged during the preceeding adsorption step as for example described more completely in Kiyonaga U.S. Pat. No. 3,176,444.

The cocurrently depressurized bed is usually further depressurized by releasing waste gas through the inlet end, i.e. countercurrently depressurized, until the bed pressure diminishes to a desired low level for purging. Then oxygen purge gas is flowed through the bed to desorb the nitrogen adsorbate and carry same out of the system. The purged and at least partly cleaned bed is then repessurized at least partly with oxygen and/or feed air and returned to the adsorption step. One such process delivering product oxygen at nearly the feed air pressure is described in Batta U.S. Pat. No. 3,564,816, and requires at least four adsorbent beds arranged in parallel flow relation. Another process delivering product oxygen at lower, slightly above atmospheric pressure is described in Batta U.S. Pat. No. 3,636,679, and requires at least three beds arranged in parallel flow relation. Still another process requiring any two adsorbent beds arranged in parallel flow relation is described in McCombs U.S. Pat. No. 3,738,087. The latter process includes an increasing pressure adsorption step of introducing feed air to the inlet end of the partially repressurized adsorption bed at pressure higher than the aforementioned intermediate pressure, selectively adsorbing nitrogen and simultaneously discharging oxygen gas, all at relative rates such that the pressure of the adsorption bed rises from the intermediate pressure during this step to higher pressure at the end of such step.

In pilot plant tests relatively high oxygen recoveries were obtained with both three bed and four bed systems. For example, in a four bed calcium zeolite A system in which the bed diameter was 4 inches and the feed air was supplied at 70°F and cycled according to the teachings of the aforementioned Batta U.S. Pat. 3,564,816, at 90% $O_2$ product purity the oxygen recovery was 45.5%. However, in commercial-scale equipment composed of calcium zeolite A beds 26 inches in diameter, the $O_2$ recoveries were substantially less than expected, i.e. 39.4% and 42.3% at air feed temperatures of 50°F and 78°F, respectively. Also, in a commercial size three bed calcium zeolite A system (26 inch bed diameter) in which the feed air was supplied at temperature of 40°F, the $O_2$ recovery was less than expected. The system stabilized at a product purity of only 66% and with an oxygen recovery of only 26.7%.

An object of this invention is to provide an improved adiabatic pressure swing process for air separation which permits oxygen recoveries in commercial size equipment which are equivalent to those obtained in small pilot plant equipment.

Other objects will be apparent from the ensuing disclosure and appended claims.

SUMMARY

This invention relates to an adiabatic pressure swing process for selectively adsorbing nitrogen from feed air to provide oxygen effluent product.

One of the more important characteristics of an adsorbent is the selectivity it exhibits for the components of a multi-component system. Crystalline zeolitic molecular sieves of at least 4 Angstroms pore size coadsorb oxygen and nitrogen from air, but selectively adsorb nitrogen relative to oxygen. It is known that this selectivity is temperature sensitive and certain prior art suggests that in the crystalline zeolitic molecular sieve-nitrogen-oxygen system, the selectivity for nitrogen improves somewhat with increasing temperature, at least up to room temperature, However, Heinze U.S. Pat. No. 3,719,205 teaches that temperature exerts an opposite effect by stating that with calcium zeolite A (Molecular Sieve 5A), the separation efficiency of an adsorption oxygen enrichment decreases with increasing temperature.

Another important characteristic of adsorption processes is adsorbent utilization or capacity for the adsorbate; it is known that utilization normally decreases with an increase of adsorption temperature. Karwat U.S. Pat. No. 3,355,859 teaches that in a pressure swing adsorption air separation process employing calcium zeolite A, it is necessary to take into consideration that the selectivity of the adsorption material for nitrogen at lower temperature is lower than at room temperature, while the amount of gas adsorbed thereby is much greater than at room temperature. The patentee also states that a satisfactory oxygen enrichment is achieved if in this case an adsorption temperature of -100°C and -60°C and preferably about -70°C. However, Skarstrom U.S. Pat. No. 3,237,377 states that room temperature is preferred for air separation by pressure swing adsorption using zeolitic molecular sieve adsorbent.

To resolve the conflicting prior art teachings regarding the effects of temperature for adiabatic pressure swing adsorption, air separation studies were conducted on the nitrogen-oxygen-calcium zeolite A system, and FIG. 1 graphically summarizes these studies along with similar studies for sodium zeolite A (Molecular Sieve 4A) and sodium zeolite X (Molecular Sieve 13X). Zeolite A is described in U.S. Pat. No. 2,882,243; the as-synthesized sodium form has an apparent pore size of about 4 Angstrom units and the calcium exchanged form has an apparent pore size of about 5 Angstrom units. Zeolite X, another synthetic crystalline zeolitic molecular sieve is described in U.S. Pat. No. 2,882,244; the as-synthesized sodium zeolite X has an apparent pore size of about 10 Angstrom units. In FIG. 1, the sodium zeolite A curve is shown by a dashed line, the calcium zeolite A curve is shown by a solid line and the sodium zeolite X curve is shown by a dash-dot-dash line. In general, the curves show that percent oxygen recovery increases with increasing temperature from 0°F up to a maximum of about 90°F and thereafter diminishes with further increasing temperature.

Significantly, the aforementioned 4 inch diameter, four bed system tested at 70°F feed air temperature yielding 45% oxygen recovery is on the calcium zeolite A curve, but the commercial size 26 inch system is substantially below the oxygen recovery predicted from the curve and based on the feed air temperatures.

The prior art has taught that in adiabatic pressure swing processes (which by definition occur without loss or gain of heat), the end-to-end bed temperature should be uniform. Recognizing that the heat effects of adsorption and desorption produce cyclic temperature swings in the bed, each active particle of adsorbent absorbs heat and rises in temperature during adsorption. During desorption, the particle releases heat and is recooled. At steady state, the quantity of fluid adsorbed by a particle equals the quantity desorbed; also the quantity of heat absorbed equals the heat released and the temperature rise equals the temperature fall. Therefore, over each full cycle the net change in temperature is zero and the adiabatic concept should be applicable to every local zone of the active adsorbent bed. Disregarding these cyclic temperature swings, the prior art has assumed that each adsorbent particle throughout the bed undergoing pressure swing adsorption experiences a uniform average temperature substantially equal to the temperature of the entering feed air.

Contrary to the prior art teachings of the art of adsorbent bed temperature during pressure swing air separation, it has been unexpectedly discovered that these beds experience a sharply depressed temperature zone in the adsorption bed inlet end. As used herein, the "inlet end" of the zeolitic molecular sieve adsorbent bed is that portion to which the feed air is introduced and which adsorbs substantially all of any contaminants contained in the air feed i.e. $CO_2$ and water. The inlet end of the bed includes 30% of the full bed length, and is measured from the point of air feed introduction and extending in the direction of air flow towards the discharge end at which the oxygen product emerges. In most instances, the inlet and discharge ends of the adsorbent bed are integral; however, the feed end may be physically separated from the remainder of the bed as long as both portions are directly joined from the fluid standpoint. This means that each part experiences the same process step at the same time.

In some instances, the aforementioned depressed temperature zone in the inlet end has been observed to experience temperature drops on the order of 100°F below the feed air temperature. By way of example, the lower curves in FIG. 2 show that with a feed air temperature of 38°F, a temperature as low as -64°F was measured a distance of 3 feet from the inlet end support screen. It is believed that the inlet end temperature depression is most severe in those systems which experience an inadvertent heat regenerative step at such end. Such heat-regenerative step serves to cyclically receive and store the chilling effect of desorption during counterflow periods of the process and to cyclically return the chilling effect to the bed during forward flow periods of the air separation process. When raw air which has not been pretreated is employed as feed, a water-loaded zone develops in this region and essentially no oxygen-nitrogen separation occurs therein. The inlet end temperature depression may be characterized as producing a temperature difference within the inlet end (between the point at which feed air is introduced and the coldest point) of at least 15°F and with the coldest temperature within the inlet end being no warmer than 35°F. The temperature depression as hereinbefore described does not occur in adsorbent beds of less than 12 inches effective diameter. As used herein, effective diameter refers to the minimum cross-sectional dimension of an adsorbent bed. In smaller beds, there is sufficient heat inleak to the adsorbent such that the atmospheric heat moderates the depression and the process is not truly adiabatic. Also, the inlet end temperature depression does not develop unless the feed air is separated to produce at least 60% oxygen. With lesser oxygen-nitrogen separations, the chilling effect of desorption is not sufficient to develop the aforementioned depression. Although there will always be a degree of depression irrespective of bed effective diameter or degree of oxygen-nitrogen separation. In such instances, the depression is not sufficient to substantially reduce the oxygen recovery and require the practice of this invention.

In this invention, only the adsorbent bed inlet end is heated sufficiently by an external source to maintain the gas flowing therethrough at maximum temperature of at least 20°F warmer than such gas without such heating but less than 175°F, preferably between 100°F and 150°F. The effect of this inlet end heating is to move the adsorbent temperature to a higher level along the curves of FIG. 1 and thereby increase the percent oxygen recovery towards the maximum possible value. The aforementioned temperature comparisons should be based on measurements at the same point of time in the cycle and at the same location in the adsorbent bed. If there is a significant variation in the temperature difference through the inlet end, the measurements should be made in the region of lowest absolute temperature and greatest difference, as for example in the 1 foot bed depth region of the FIG. 2 system. In preferred practice, the heat to be added is introduced as sensible heat in warm process streams entering the feed air inlet end of the adsorbent bed. In most pressure swing adsorption air separation processes, the feed air is compressed to superatmospheric pressure and the heat of compression is more than adequate to supply the aforementioned inlet end heating. Heat addition is for example readily controlled by removing only a limited amount of the heat of compression from the feed air. This may be readily accomplished by controlling the aftercooler water temperature, or by employing a controlled feed air bypass around the aftercooler. Adsorbent bed inlet end heating may also be achieved by introducing externally generated heat to the air feed, as for example with a shell-tube heat exchanger employing steam as the heating medium. This latter method is usually unnecessarily expensive for processes operating at superatmospheric pressure but may be essential for vacuum-purged systems. Similarly, the heat may be introduced to a recycled process stream from the discharge end of the adsorbent beds, as for example heating oxygen by an external source prior to introduction at the feed air inlet end for partial repressurization of a purged bed at low pressure.

More specifically, this invention relates to an adiabatic pressure swing process for air separation by selectively adsorbing at least nitrogen alternately in at least two crystalline zeolitic molecular sieve adsorption beds of at least 4 Angstroms apparent pore size at ambient temperature wherein the feed air is introduced at temperature less than 90°F to the inlet end of a first adsorption bed at high pressure and at least 60% oxygen discharges from the discharge end of the bed. In this type of process, the first bed is cocurrently depressurized and the cocurrent depressurization is terminated when the first bed is at lower pressure. Part of such oxygen from the cocurrent depressurization is returned or recycled for repressurization of another adsorption bed. Waste gas is released from the first bed inlet end thereby counter-currently depressurization same to a lowest pressure and then oxygen gas is introduced from another adsorption bed discharge end to the first bed discharge end as purge gas for desorption of the nitrogen adsorbate, the adsorbate-containing purged gas being discharged from the first bed inlet end as waste gas. Oxygen gas from the discharge end of an other-than-first adsorption bed in introduced at above said lowest pressure to the purged first bed for at least partial repressurization thereof. In this prior art air separation process the aforedescribed gas flows are such that the coldest temperature within the first bed inlet end is no warmer than 35°F and the temperature difference within the first bed inlet end is at least 15°F. Under these conditions the aforedescribed sharply depressed temperature zone substantially reduces the oxygen recovery from the process.

In this invention, only the inlet end (and not the intermediate section nor the discharge end except to the extent heat may flow to these sections from the heated inlet end) of the beds is heated by an external source sufficiently to maintain the gas flowing therethrough at maximum temperature of at least 20°F warmer than such gas without such heating but less than 175°F, and preferably between 100° and 150°F. As will be hereinafter demonstrated, this invention significantly improves the oxygen recovery from adiabatic pressure swing air separation processes.

BRIEF DESCRIPTION OF THE DRAWINGS

FIG. 3–3D are a series of schematic flowsheets showing various means for heating the adsorbent bed inlet end according to the invention.

FIG. 4 is a schematic flowsheet of apparatus suitable for air separation in four adsorbent beds piped in parallel flow sequence to produce oxygen at substantially the feed pressure.

FIG. 5 is a preferred cycle and time program for various steps of a high pressure oxygen product system which can be practiced with the FIG. 4 apparatus.

FIG. 7 is a schematic flowsheet of apparatus suitable for separating air in each of two adsorbent beds in parallel flow sequence to produce oxygen.

FIG. 8 is a preferred cycle and time program for practice with the two bed FIG. 7 apparatus.

DESCRIPTION OF THE PREFERRED EMBODIMENTS

Figure 1:
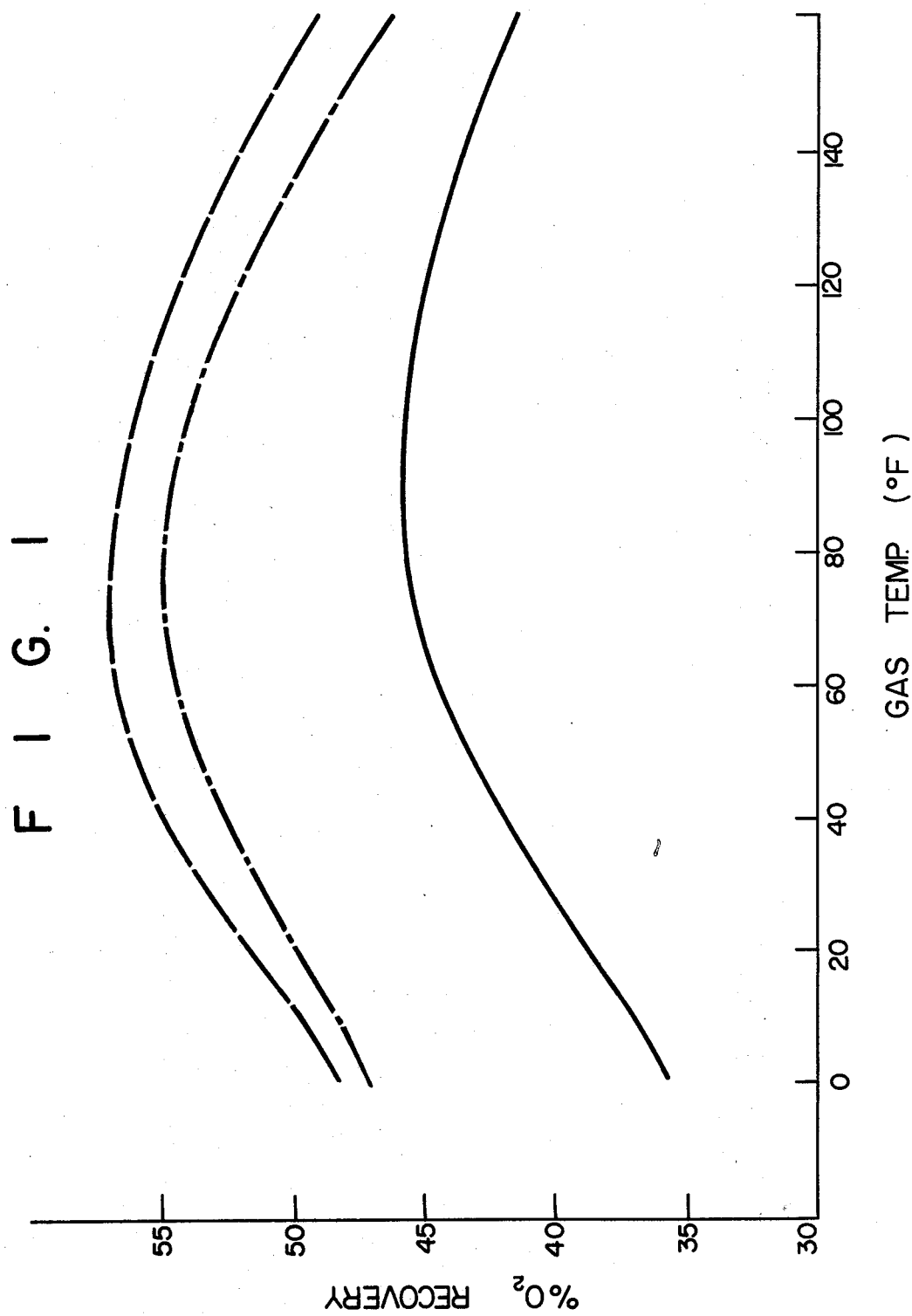
FIG. 1 is a graph showing the percent oxygen versus gas temperature relationship for various forms of zeolite A.

The invention may be mathematically described by the introduction of an amount of heat, Q, to the feed or inlet end of the zeolitic molecular sieve adsorbent beds to satisfy the equation:

$$Q = F\, c_p\, (T_X - T_A) \tag{1}$$

where in Equation 1 and in the following equations:
$Q$ = heat added to the air inlet end of the beds,
$F$ = quantity of air feed,
$T_A$ = ambient temperature of the air feed, °F,
$c_p$ = specific heat of the air feed F, $T_X$ = temperature of the air feed °F, when the air feed is the sole source of heat $Q$, such that $175°F > T_X > 90°F$ all in consistent units.

The invention in its broadest aspect is schematically illustrated in these mathematical terms by FIG. 3. Several specific embodiments are illustrated in schematic FIGS. 3A, 3B, 3C, and 3D, all as hereinafter described.

Stated otherwise, a quantity of heat is added to the air inlet end of the beds equivalent to the quantity of heat, referenced to $T_A$ and contained in air feed stream F, such that the temperature of the air feed stream in the inlet end is $175°F°T_X > 90°F$.

The addition of heat Q may for example be accomplished by:

A. Controlling the net heat of air compression and heating the inlet end. More than sufficient heat is introduced as heat of compression; therefore, controlled heat addition can be accomplished conviently by selectively bypassing a portion of the compressed air ($A_{BP}$) around the compressor aftercooler as illustrated in FIG. 3A.

$$Q = Q_c - Q_w - F\, c_p\, (T_X - T_A) \tag{2}$$

where:
$Q_w$ = the heat extracted by the cooling water (W),
$Q_c$ = the heat introduced by compression.

B. The net heat of compression may also be controlled by selectively cooling the total compressor discharge air. This cooling can be accomplished by regulating the cooling water temperature or cooling water flow rate (W) as illustrated in FIG. 3B. Cooling water systems which include a cooling tower T are convenient for the practice of cooling water temperature control since a portion of the return cooling water can be caused to selectively bypass the tower ($W_{BP}$).

$$Q = Q_c - Q_w = F\, c_p\, (T_X - T_A) \tag{3}$$

where:

$Q_q$ = heat introduced by compression,
$Q_T = Q_w$ = heat extracted by cooling tower $T$.

C. Externally generated heat may be added to the air feed or directly to the adsorbent bed as illustrated in FIG. 3C.

$$Q = Q_F + Q_B = F\ cp\ (T_X - T_A) \qquad (4)$$

where:

$Q_F$ = heat introduced to the air feed,
$Q_B$ = heat introduced directly to the adsorbent bed.
The heat, $Q_B$, may for example be added by an electric heater or fluid-conducting tube coil C located in the dished head of the adsorbent bed-containing vessels or the device may be embedded in the air inlet end of the packed bed section. The preferred location for embedded heat exchange mechanisms is within the initial 15% of bed length. The externally supplied heat, $Q_F$, can be added by any appropriate heat exchange mechanism as for example a shell-tube unit employing steam as the heating medium.

D. Introducing a recycled process stream R to the feed end of the bed, as for example illustrated in FIG. 3D. Stream R may for example be oxygen gas discharged from another adsorbent bed during its cocurrent depressurization step, heated by an external source and returned to the inlet end for both heating and partial repressurization. In this embodiment:

$$Q = Q_R + Q_R' = F\ cp\ (T_X - T_A) \qquad (5)$$

where:

$Q_R$ = heat introduced to stream $R$ from an external heat source
$Q_R'$ = sensible heat, referenced to $T_A$, which is contained in recycle stream, $R$, prior to the introduction of $Q_R$.

E. Any suitable combination of the above described methods.

$$Q = Q_c + Q_F + Q_B - Q_w + Q_R + Q_R' = F\ cp\ (T_X - T_A) \qquad (6)$$

where $Q$, $Q_c$, $Q_F$, $Q_B$, $Q_w$, $F$, $Q_R$, $Q_R'$, $cp$, $T_X$ and $T_A$ in the general Equation 6 are as previously described.

Any of aforedescribed systems for introducing heat to the feed air inlet end of an adiabatic pressure swing adsorption system (as previously characterized) will substantially improve the oxygen recovery in such system. FIGS. 4 – 9 illustrate such adiabatic pressure swing adsorption systems for air separation, to which this invention may be successfully applied.

When the product oxygen is needed at substantially the same pressure as the feed air, a four bed system as for example described in Batta U.S. Pat. No. 3,564,816 is particularly suitable as hereinafter described and illustrated in FIGS. 4 and 5. Although the selective adsorption will be only described in terms of removing nitrogen from the feed air stream to produce oxygen, it will be understood that atmospheric impurities, primarily water and $CO_2$ but also trace amounts of light hydrocarbons, are also selectively adsorbed in preference to oxygen by crystalline zeolitic molecular sieves of at least 4 Angstroms pore size. These impurities are desorbed from the adsorbent bed during the low pressure purging, along with the nitrogen.

FIG. 4 shows four adsorbent beds, A, B, C and D connected in parallel flow relation between feed air manifold 10 and unadsorbed product oxygen manifold 11. Automatic valves 1A, 1B, 1C and 1D direct feed air flow respectively to first bed A, second bed B, third bed C and fourth bed D. Automatic valves 2A, 2B, 2C and 2D, respectively, direct product oxygen from the same beds into product manifold 11.

The adsorbed nitrogen rejected by counter-current depressurization and purge through waste manifold 12 at the inlet end of the beds. Adsorbers A and B are joined at their inlet ends by conduit 13 having automatic valves 3C and 3D therein. Adsorbers C and D are joined at their inlet ends by conduit 14 having automatic valves 3C and 3D therein.

First stage equalization conduit 15 is provided joining the discharge ends of adsorbers A and B; similarly first stage equalization conduit 16 is provided joining the discharge ends of adsorbers C and D. To provide first stage pressure equalization, automatic valves 4AB and 4CD are located in conduits 15 and 16, respectively. Valves 17 and 18 in series with equalization valves 4AB and 4CD, respectively, are manual preset throttling devices which prevent excessively high flow rates from occurring and which allow adjustment and balancing of equalization rates between the adsorption bed pairs AB and DC.

Automatic valves 5A, 5B, 5C and 5D are provided at the discharge ends of the beds, two of which open together to pass cocurrent depressurization gas from one adsorbent bed for use as purge gas in another bed. Manual valves 19 and 20 in the purge cross-over conduits 21 and 22 respectively serve the same purpose as explained previously for valves 17 and 18 in the first stage pressure equalization circuit. The purge cross-over conduits 21 and 22 (piped in parallel flow relation) also contain back pressure regulators 23 and 24 oriented in opposite flow directions so as to control flow in either direction between either bed A or B and bed C or D. The back pressure regulators 23 and 24 are set to maintain a minimum pressure, e.g., 50 p.s.i., in the bed undergoing cocurrent depressurization. When this pressure is reached the cocurrent depressurization and purge steps terminate. This arrangement prevents extension of cocurrent depressurization to excessively low pressure with resultant breakthrough of the one component's adsorption front.

As previously indicated, valves 17, 18, 19 and 20 are flow rate limiting devices which prevent bed damage due to excessive $\Delta P$ and fluid velocity. A similar precaution may be followed during countercurrent depressurization, by means of preset throttle valve 25 which acts as a bypass around main waste valve 26 in waste conduit 12. During countercurrent depressurization the automatic main waste valve 26 is closed which forces the gas to follow the bypass route through valve 25. During the following lowest pressure purge step, valve 26 opens to minimize flow resistance in the waste conduit 12.

Repressurization conduit 27 having constant flow control valve 28 therein joins product manifold 11 for introduction of unadsorbed product effluent from the adsorber (on the absorption step) to a different adsorber having been partially repressurized to lower intermediate pressure. Conduit 27 in turn joins product return conduit 29 communicating with repressurization valves 6A–6D joining the product conduits to adsorbers A–D respectively. Cross-over conduits 43 and 44 carry the released gas from the second lower pressure equalization steps of beds A and B to beds C and D, and from the latter to the former, respectively. At the inlet end four additional sequencing valves 7A, 7B, 7C and 7D are provided in conduits 45 and 46 joining beds AB and CD, respectively.

Second stage pressure equalization conduit 40 communicates at opposite ends with the bed A discharge end through valve 5A, bed B discharge end through valve 5B, bed C discharge end through valve 5C and bed D discharge end through valve 5C and bed D discharge end through 5D. Flow conduit 41 is controlled by valves 41 and 42.

The adsorption step is terminated when the nitrogen adsorption front is entirely within the bed. This point may be determined in a manner well known to those skilled in the art, using the feed conditions, and the absorbent's capacity and dynamic characteristics. Also the first pressure equalization step and the cocurrent depressurization step are stopped when the adsorption front is still entirely within the bed and before breakthrough. This permits removal of the nitrogen adsorbate from the void space gas by the bed discharge end, so that the emerging equalization gas and the purge gas have virtually the same purity as the product gas. If the cocurrent depressurization step is conducted before the second equalization step then all void gas recovery steps must be complete while the adsorption front is still entirely within the source bed. If the second equalization step is carried out after the cocurrent depressurization step, the former may continue past the breakthrough point as the emerging gas is used for feed end repressurization. Breakthrough may for example be identified by monitoring the nitrogen concentration in the discharge gas, and detecting the moment at which this concentration appreciably increases. The purge step is most efficiently performed by removing only the adsorbables deposited in the preceding step. That is, the bed is not completely cleaned of all nitrogen by the purge fluid, but the latter's counter-current flow insures that the adsorption front is pushed back towards the inlet end. This insures a clean product during even the initial portion of the succeeding adsorption step.

The use of the FIG. 4 system to practice the four-bed embodiment will be more easily understood by reference to the FIG. 5 cycle and time program. There are six distinct steps each involving commencement and/or termination of flows. Streams flowing into and out of the four-bed system are indicated by vertical lines connecting the feed manifold 10, the unadsorbed product oxygen effluent manifold 11 and the desorbate waste nitrogen manifold 12. The feed manifold 10 connects vertically with each of the four adsorption steps and the latter in turn join vertically with the product manifold 11. The countercurrent depressurization and purge steps, during which the adsorbed nitrogen is discharged from the beds, are connected vertically with the desorbate waste manifold 12. The repressurization steps which use a portion of the unadsorbed product oxygen effluent are connected vertically with the product manifold 11. All gas flows associated with the four beds are identified on the figure.

At least four adsorbent beds are needed to match, timewise, those steps in which cocurrent depressurization streams become available with those steps which can utilize these streams. Otherwise large holdup tanks would be required. It will be apparent from FIG. 5 that at any moment of time, one of the adsorbent beds is on its adsorption step delivering product at substantially constant pressure to the product manifold 11. At the same moment the other three beds are being cocurrently depressurized, or first or second stage pressure equalized, cleaned of the adsorbed component and/or repressurized respectively for the succeeding adsorption step. One of the beds is always receiving product gas for repressurization so that the consumption of product for this purpose is continuous rather than intermittent.

In FIG. 5 the utilization within the system of the pressure equalization and cocurrent depressurization gas is indicated by horizontal flow lines. Each first (I) pressure equalization step is connected horizontally with a repressurization step in another bed having already been partially repressurized, and each second (II) pressure equalization step is connected horizontally with a repressurization step of a different bed having just been purged. Each cocurrent depressurization step is connected horizontally with a purge step in a different bed.

Each step in the cycle of bed A will now be outlined and related to those components of FIG. 4 which are involved in the cycle changes. Pressures illustrative of such operation are included.

Time 0–60 seconds: Bed A is on adsorption at 40 psig. Valves 1A and 2A are open, and valves 3A, 4AB, 5A and 6A are closed.

Time 60–78 seconds: At the end of the adsorption step, valves 1A and 2A close, and valve 4AB opens to commence first-stage pressure equalization between beds A and second bed B. At this moment, all other valves associated with bed B are closed except valve 6B (valves 1B, 2B, 3B, 7B and 5). Valve 17 limits the flow rate of equalization gas to avoid bed fluidization, the direction being countercurrent to feed gas flow in bed B.

Time 78–102 seconds: When pressures in beds A and B have equalized at a higher intermediate level of about 26 psig, valve 4AB closes and valves 5A, 19 and 5C open allowing purge gas to flow from bed A into third bed C countercurrent to feed gas flow. At this moment, all other valves associated with bed C except valve 3C are closed (valves 2C, 1C, 4CD and 6C). Valve 23 throttles and limits the flow of purge gas so that bed C remains at substantially one atmosphere pressure.

Time 102–120 seconds: At the end of the purge step for third bed C, first bed A will have depressurized to about 16 psig. At this point, valve 3C closes so that the continued flow of gas from bed A into bed C is bottled up. The continued flow of gas cannot be carried by the purge crossover (conduit 21, valves 23 and 19) because the regulator valve 23 is set to terminate the purge flow when the pressure in bed A has dropped to the predetermined lower limit for the withdrawal of purge gas (e.g., 16 psig). Therefore, the continued gas flow for countercurrent pressurization of bed C is shunted through conduit 43 by opening valve 7C and closing valve 23. Beds A and C equalize at a lower intermediate pressure of about 8 psig.

Time 120–138 seconds: First bed A is now countercurrently depressurized to essentially one atmosphere pressure as the lowest pressure of the process by closing valve 5A and opening valve 3A. Valve 26 in the waste conduit 12 also closes forcing the blowdown gas through flow-restrictive device 25.

Time 138–162 seconds: Purge gas for first bed A is obtained from concurrent depressurization of fourth bed D which is between its two pressure-equalization steps. Valves 5A, 20 and 5D open to permit this flow countercurrent to the previously flowing feed gas. At this time, all valves associated with bed D other than valve 5D are closed. Valve 24 throttles and limits the flow of purge gas so that bed A remains at substantially one atmosphere. Valve 26 in the waste conduit 12 is also reopened so as to minimize flow resistance to the low-pressure purge gas.

Time 162–180 seconds: Bed A is now cleaned and ready to be repressurized cocurrently. The initial phase of repressurization is accomplished by continued introduction of void space gas from fourth bed D. Valves 3A and 20 close and valve 7A opens to permit flow of gas from bed D to bed A. This partial cocurrent repressurization of first bed A continues until it is pressure equalized with fouth bed D at lower intermediate pressure, e.g., about 8 psig. This is also the second or lower pressure equalization stage of bed D.

Time 180–198 seconds: The next phase of bed A repressurization is accomplished by higher pressure equalization with second bed B which has just completed its adsorption step and is initially at full feed pressure. Valves 5A and 7A close, and valve 4AB opens to admit void space gas discharged cocurrently from bed B. Valve 17 limits the flow to prevent bed fluidization. This further countercurrent repressurization of first bed A continues until it is pressure equalized with second bed B at higher intermediate pressure, e.g., about 26 psig. This is the first or higher pressure equalization stage of bed B.

Time 198–240 seconds: The final phase of bed A repressurization to substantially feed pressure is accomplished with product gas discharged from third bed C through manifold 11, which gas is preliminarily flow-regulated by device 28 into repressurization manifold 29. Valve 4AB is closed and 6A opened to admit the regulated product gas into bed A. In preferred practice, this final phase of repressurization using product gas commences at minute 18 and proceeds simultaneously with the first higher pressure equalization step of bed B. Such overlapping of the two sources of repressurization gas is advantageous because it smooths the internal utilization of product and avoids fluctuations of product flow and pressure. When bed A reaches the pressure level of manifold 29, valve 6A is closed and the bed is again ready to receive feed air for separation repeating the aforedescribed cycle step sequence.

The above described cycle for bed A is typical for beds B, C and D. As represented in FIG. 4, the time sequence for placing beds on-stream for adsorption is A, D, B and C, i.e. the first, fourth, second and third beds. The cycling of the system was accomplished by advancing a stepping mechanism which was activated by the closing of appropriate time delay and pressure switch relays. The stepping switch mechanism controlled the opening and closing of the automatic valves according to the described sequence.

EXAMPLE I

In experiments performed using the above-described four bed system of FIGS. 4 and 5, the beds were 96 inches long and contained in 26 inch inside diameter vessels. The adsorbent was 1/16 inch pellets of calcium zeolite A. The feed air was not pretreated to remove $CO_2$ and was water saturated. Each of the vessels contained 1200 lb. of adsorbent and the system was fed air at the rate of 9246 scfh. The temperature of the feed air was 64°F (due to only partial after-cooling to remove heat of compression) although the ambient temperature ($T_A$ in equation 1) was only 45°F. Part of the separated oxygen gas was returned to the feed end of the purged bed for partial repressurization of same, as for example illustrated as stream R in FIG. 3d. This recycled stream contains sensible heat $Q'_R$, but no additional heat from an external source was introduced to the gas prior to introduction at the feed end. Using equation 1, it may be calculated that the additional heat introduced to the feed air above the 45°F ambient (by virtue of the 64°F actual temperature plus the recycle oxygen heat) is equivalent to 3130 Btu/hr., and would provide a $T_X$ value of 67.4°F.

In operation, the coldest and warmest gas temperatures in the bed inlet end were measured at 18°F and 58°F respectively, so that the temperature difference within the inlet end was 40°F. Continued cycling of the system at the aforedescribed conditions resulted in a decrease of the oxygen content of the product, so that the product extraction rate was adjusted to maintain a product purity of 90% oxygen. The system stabilized at a product rate of 855 scfh, representing a recovery of only 39.8%

EXAMPLE II

The same four bed system used in Example I was used for this experiment. The feed air (not pretreated for removal of atmospheric impurities) to the compressor was at 75°F, corresponding to $T_A$ in equation 1. The compressed and warmed air was only partially after-cooled in the manner of FIG. 3b, i.e. by controlling the cooling water temperature, and introduced adsorbent bed inlet end at temperature of 110°F and flow rate of 8960 scfh. The oxygen product was used for partial inlet end repressurization of the purged bed in the manner of FIG. 3d but no external heat was added to this return stream, i.e. the value of $Q_R$ was zero. The total Q ($Q_c$–$Q_w$+$Q_R'$) added to the feed air inlet end of the adsorption beds was 6470 Btu per hour, corresponding to a $T_X$ (as defined in equation 1) of 115.2°F. In operation, the coldest and warmest temperatures of the feed air inlet end were measured at 53° F and 90°F respectively, so that the temperature difference within the inlet end was still very substantial − 37°F. However, with a product oxygen extraction rate of 972 scfh, the system stabilized at a product purity of 89.5%, representing an oxygen recovery of 46.4%. It will be apparent from a comparison with the Example I prior art oxygen recovery of 39.8% that this invention represents a substantial improvement.

Figure 6:
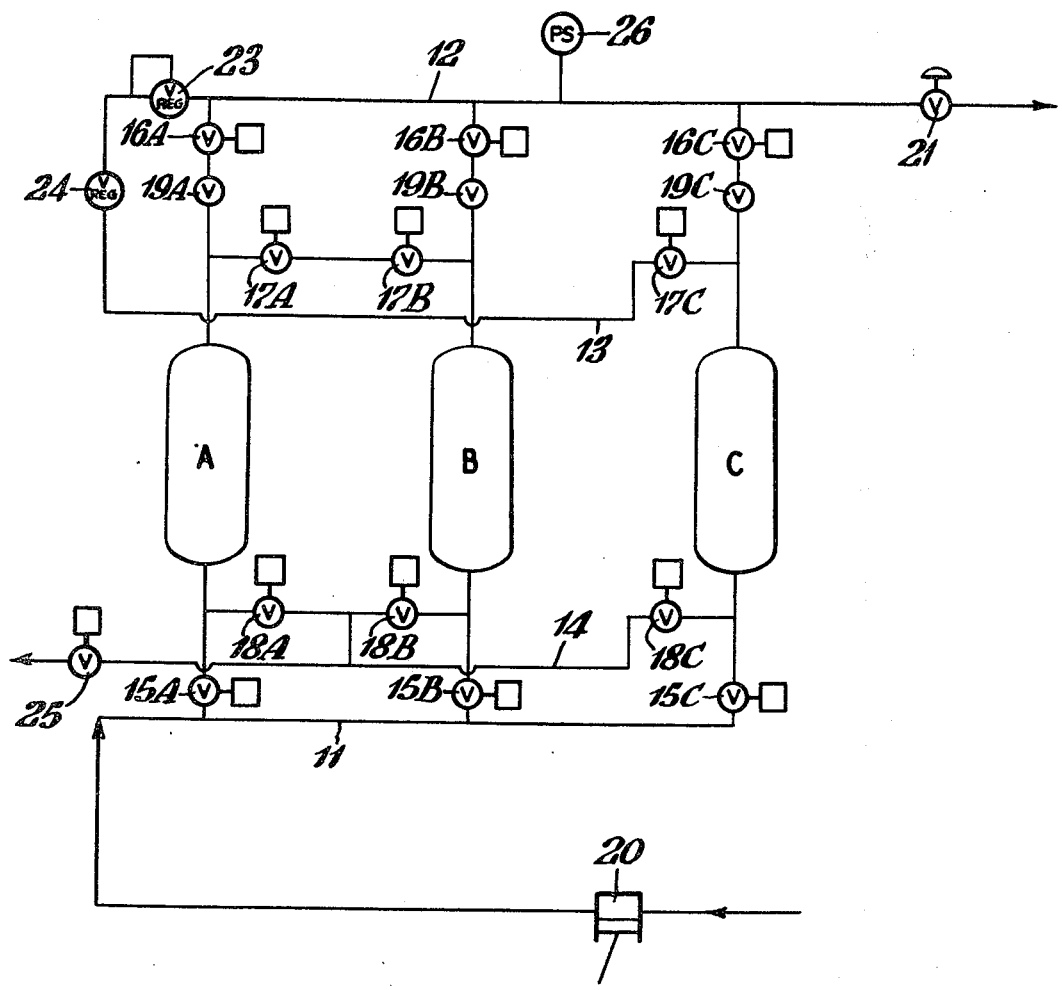
FIG. 6 is a schematic flowsheet of apparatus suitable for separating air in each of three adsorbent beds to produce oxygen at substantially lower pressure than the feed air.

The FIGS. 4–5 embodiment is particularly attractive where the oxygen product is needed at substantial pressure, i.e., relatively high pressure approximating that of the compressed feed air, but FIG. 6 illustrates a three adsorbent bed system (described in greater detail in Batta U.S. Pat. Nos. 3,636,679 and 3,717,974, and incorporated herein to the extent pertinent) which may be preferred when the oxygen product is to be consumed at only slightly above atmospheric pressure, e.g., as the aeration gas for an activated sludge waste treatment system. In the latter embodiment, at least the major part of the feed air is introduced attendant a rise in adsorbent bed pressure. The bed pressure rises because the net instantaneous rate of gas introduction (inflow minus outflow) exceeds the adsorption capability of the bed. These embodiments are distinct from those wherein at least the major part of the feed air is introduced during a steady pressure adsorption step, i.e., wherein the net rate of feed air introduction equals the adsorption capability of the bed.

Referring now to FIG. 6, it shows three adsorbent beds A, B, and C connected in parallel flow relation between feed air manifold 11, oxygen effluent gas manifold 12, oxygen purge manifold 13 and waste manifold 14. Automatic valves 15A, 15B and 15C direct feed air flow respectively to first bed A, second bed B, and third bed C. Automatic valves 16A, 16B, and 16C respectively direct effluent oxygen gas from the same beds into manifold 12. Purge manifold 13 joins one oxygen effluent gas manifold 12 at the discharge end of the three beds, and oxygen purge gas is introduced through automatic valves 17A, 17B, and 17C to beds A, B, and C countercurrent to the direction of feed air flow. Automatic valves 18A, 18B, and 18C join waste manifold 14 at the inlet end of the corresponding beds for discharge of countercurrent depressurization gas and purge gas. Valves 19A, 19B, and 19C at the discharge end upstream of oxygen effluent valves 16A, 16B, and 16C respectively are the manual trim type for limiting the flow of pressure equalization gas.

Figure 2:
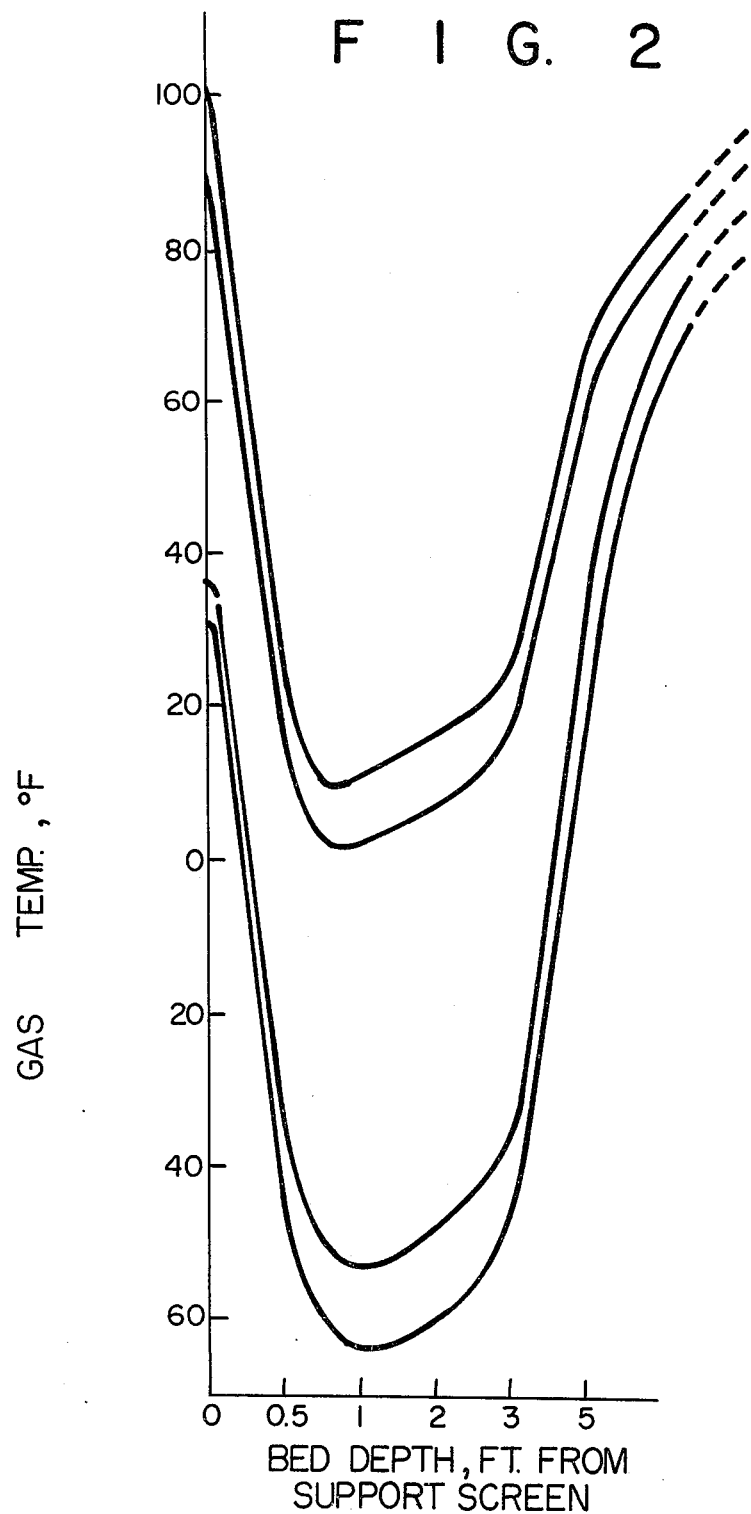
FIG. 2 is a graph showing the adsorbent bed temperature versus bed depth for prior art practice and also a three adsorbent bed embodiment of the instant process.

One timing sequence suitable for use with the FIG. 6 system comprises FIG. 2 of the aforementioned Batta U.S. Pat. No. 3,636,679, employing six distinct steps each involving commencement and/or termination of flows. Streams flowing into and out of the three bed system are indicated by vertical line flows in the feed manifold 11 and in the oxygen effluent gas manifold 12. The feed air manifold 11 connects horizontally with each of the three adsorbent beds and the latter in turn join horizontally with the oxygen effluent manifold 12. The repressurization and purge steps which use a portion of the oxygen effluent are connected horizontally with the steps, e.g., cocurrent depressurization and pressure equalization which supply the returned oxygen gas. All inter-bed flows are identified on the figure.

It will be apparent from the afore-referenced timing sequence figure that at any moment of time one of the adsorbent beds is delivering product oxygen at progressively diminishing pressure to the product manifold 12 as follows: bed C during 0–40 seconds, bed A during 40–80 seconds and bed B during 80–120 seconds. Accordingly, product oxygen flow to the consuming means is continuous.

The utilization within the system of the pressure equalization and cocurrent depressurization gas is indicated by horizontal flow lines. Each pressure equalization step is connected horizontally with a repressurization step in another bed having already been purged, and each cocurrent depressurization step is connected horizontally with a purge step of a different bed having just been counter-currently depressurized.

Each step in the cycle of bed A will now be outlined and related to those components of FIG. 6 which are involved in the cycle changes. Pressures illustrative of such operation for air separation using calcium zeolite A adsorbent are included.

Time 0–15 seconds: Bed A is being repressurized, bed B countercurrently depressurized, and bed C pressure equalized. Valves 15A and 16A are open, and valves 17A and 18A are closed. Feed air is introduced to bed A at its inlet end from manifold 11, and one component depleted gas from manifold 12 is simultaneously introduced at the bed A discharge end. The latter is derived from bed C through trim valve 19C and valve 16C, and flows consecutively through valves 16A and trim valve 19A into bed A. Bed C is cocurrently depressurized during this period and the flow continues until pressure between beds A and C is substantially equalized at about 15 psig. During this period, the flow of equalization gas is rapid while the flow of feed air from compressor 20 is limited so that the major portion of the gas for repressurizing bed A from 0 to 15 psig is oxygen gas. During this period, another part of the gas released from bed C is discharged as product oxygen in manifold 12.

Time 15–40 seconds: Valve 16A is now closed and only the flow of feed air continues to bed A until the terminal pressure of 30 psig is reached. This completes the repressurization period for bed A.

Time 40–55 seconds: The pressure equalization step for bed A commences by closing valve 15A and opening valves 16A and 16B cocurrently depressurizing the bed by releasing gas from the discharge end. Oxygen product gas flows through control valve 21 in manifold 12 to the product conduit downstream valve 21 at a rate serving to hold the product conduit at a suitable low pressure such as 3 psig. The remainder and major part of the oxygen gas flows through valves 16B and 19B to the discharge end of bed B for partial repressurization thereof. Bed B has previously been purged of nitrogen adsorbate and is initially at about 0 psig. This flow of product gas from bed A to bed B continues for about 15 seconds until the two beds are at substantially the same pressure, e.g., 15 psig.

Time 55–80 seconds: Additional nitrogen-depleted gas is released from the bed A discharge end for further cocurrent depressurization thereof, with one part introduced to the bed C discharge end by closing valve 16B and opening automatic valve 17C in the purge manifold for purging nitrogen at slightly above 0 psig. Valves 23 and 24 reduce the purge gas pressure to essentially 1 atmosphere and also hold the flow rate of purge gas constant. This, in turn, holds the total quantity of purge gas constant since the purge step is preferably a fixed length of time. The flow rate is controlled at a steady value by regulating valve 23 which holds the pressure constant between the two valves 23 and 24. The waste gas emerging from bed C inlet end flows through automatic valve 18C in waste manifold 14 and is released through automatic waste discharge valve 25. The last-mentioned valve is a flow-limiting device rather than the shut-off type. When "closed," it introduces a flow restriction into the waste manifold 14 which reduces the depressurization rate to a value below that causing attrition of the adsorbent particles. However, for the discharge of purge gas, valve 25 is open to remove the restriction inasmuch as flow is already limited by valve systems 23 and 24. Another part of the additional nitrogen-depleted gas from bed A is discharged as oxygen product. During this step, the pressure of bed A and manifold 12 continues to decrease until it reaches about 11 psig, which occurs after an additional 25 seconds (80 seconds into cycle). The lowest pressure limit for cocurrent depressurization, e.g., 4 psig, should be maintained because the pressure corresponds to imminent breakthrough of the adsorption front at the discharge end of the bed. This completes the production phase for bed A.

Time 80–95 seconds: Bed A now begins its nitrogen adsorbate rejection (desorption) phase by closing valves 16A and 17C, and opening valve 18A. Additional gas at 4 psig is released from the bed A inlet end from countercurrent depressurization thereof through waste manifold 14 and discharge valve 25. The latter valve is "closed" for this step in order to introduce the aforesaid restriction and avoid excessive flow rates from the bed. This step continues to essentially 1 atmosphere in about 15 seconds.

Time 95–120 seconds: Bed A is purged of remaining nitrogen adsorbate by opening valves 17A and 25. Additional nitrogen-depleted gas from the discharge end of bed B flows through manifold 12 through valves 23 and 24 and purge manifold 13, then through valve 17A to the bed A discharge end. The nitrogen-containing purge gas emerging through the bed A inlet end flows through valve 18A and is discharged through waste valve 25. Purging continues for 25 seconds. This completes the cycle and bed A is in a condition to commence repressurization with feed air.

Beds B and C are consecutively cycled through the aforediscussed steps with bed B entering the simultaneous feed air-product oxygen repressurization with the bed A pressure equalization step (time 40–55 seconds). Bed C enters the simultaneous feed air-product oxygen repressurization with the bed A countercurrent depressurization step (time 80–95 seconds). The necessary valve changing for these steps will be recognized from FIG. 6, Batta U.S. Pat. No. 3,636,679 (FIG. 2) and the foregoing description. A cycle control system is necessary to initiate and coordinate these valve changes. The cycle controller may for example receive a signal from pressure sensing means in feed air conduit 11 downstream compressor 20.

Summarizing the aforedescribed three adsorption bed system which is preferred when oxygen gas product is to be discharged at low pressure, the first bed is initially at the lowest pressure and purged of nitrogen adsorbate. Feed air and oxygen gas are simultaneously introduced respectively to the first bed inlet end and discharge end. Oxygen gas is simultaneously released from the discharge end of a third bed initially at the highest superatmospheric pressure with one part discharged as product and the balance returned to the first bed discharge end for such simultaneous introduction, the gas flows continuing until the first and third beds are first higher pressure equalized. After terminating the oxygen gas introduction to the discharge end, the feed air introduction to the first bed inlet end is continued until the bed is repressurized to the highest superatmospheric pressure. Oxygen is thereafter released from the repressurized first bed discharge end with one part thereof discharged as product and the balance returned to the discharge end of a partially repressurized second bed for simultaneous introduction during feed air introduction to the second bed inlet end until the first and second beds are first higher pressure equalized. The first bed is then cocurrently depressurized to about 21 psia. The cocurrent depressurization of the first bed is continued with one part of the oxygen discharged as product and the balance returned to the third bed discharge end for purging of nitrogen adsorbate therefrom. The first bed is thereafter countercurrently depressurized and oxygen from a cocurrent depressurizing second bed is then returned to the first bed discharge end for purging thereof. The aforedescribed steps are consecutively followed with the second and third beds in accordance with the flow cycle sequence of FIG. 2 in Batta U.S. Pat. No. 3,636,679

EXAMPLE III

In experiments performed using the above-described three bed system of FIGS. 6 and 7 FIG. 6 herein and FIG. 2 in Batta U.S. Pat. No. 3,636,679, the beds were 96 inches long and contained in 26 inch inside diameter vessels. The adsorbent was 1/16 inch pellets of calcium zeolite A. The feed was not pretreated to remove $CO_2$ and was water saturated. Each of the vessels contained 1200 lbs. of adsorbent and the system was fed air at the rate of 9030 scfh. and at temperature of 38°F which was ambient ($T_A$ in accordance with equation 1). The aforementioned highest superatmospheric pressure was 45 psia. The value of $T_X$ (as defined) was 38°F and the corresponding value of $Q$ (as defined ) was zero. Bed A was equipped with thermocouples located at the axis of the vessels and at spaced distances from the air inlet end to the discharge end. Beds B and C were equipped with an axially positioned thermocouple located 2 feet into the air inlet end of the bed.

Product was extracted at the rate of 770 scfh. and analyzed for oxygen content. Continued cycling of the system resulted in a depressed temperature zone at the inlet end as depicted in the two lower curves of FIG. 2. In the latter, the curves are used to show the range of temperatures between the coldest and warmest section of the beds at the same point in time. Two curves are plotted for Example III to depict the temperature variation which is experienced at a single point in the bed. This temperature variation is a measure of the cyclic temperature effect which is common to adiabatic pressure swing adsorption processes, and is very small as compared to the magnitude of the stable end-to-end bed temperature gradient which developed. It is significant to note that relatively little temperature drop occurs in the first few inches adsorbent bed length because this section is loaded with preferentially adsorbed air impurities (primarily water and $CO_2$) and virtually no nitrogen is adsorbed therein. The temperature drops sharply farther into the first foot of bed length to a low point about −65°F at a distance 1 foot from the support screen, so that the temperature difference within the inlet end is 103°F. The screen stabilized at a product purity of only 66% oxygen with 26.7% oxygen recovery.

EXAMPLE IV

The same three bed system used in Example III was used for this experiment. The feed air at 9000 scfh. and 38°F was preheated as illustrated in FIG. 3C by indirect heat exchange with steam to 110°F, so that $T_X$ assumes this value. The $Q$ (as defined) added was 11,300 Btu per hour, and with a product extraction rate of 774 scfh., the operation stablized at a product purity of 82% oxygen representing a recovery of 33.6%. The temperatures within the beds are depicted by the two upper curves of FIG. 2. It will be observed that the practice of this invention did not eliminate the adsorbent bed end-to-end temperature gradient but instead moved the level of the inlet end temperature depression substantially upwardly so that the system operated in a higher range of the FIG. 1 oxygen recovery vs. gas temperature curve.

Another significant observation is that the temperature depression in the three bed system of Examples III and IV was greater than the temperature depression experienced with the four bed systems of Examples I and II.

EXAMPLE V

Additional tests were performed using the three bed equipment and cycle described in connection with Examples III and IV, and with feed air temperatures ($T_x$) of 100°F to 175°F within the adsorbent bed inlet end, the oxygen recovery and purity were comparable to that achieved in Example IV. For example, with an inlet end air temperature of 175°F, the $O_2$ recovery was 32.7% at 87% oxygen purity. When the feed air was heated sufficiently for an inlet end temperature of 220°F, the $O_2$ recovery was only 29.5%. Accordingly, more energy has been consumed with lower oxygen recovery and for this reason, there is no significant advantage in operating the present process at inlet end temperatures above 175°F. The preferred range of maximum inlet end temperatures, between 100°F and 150°F, represents a balance between increasing energy requirement and oxygen recovery.

EXAMPLE VI

In still another test using the three bed equipment and cycle described in connection with Examples III and IV, the feed air was pretreated to remove atmospheric impurities, so that the entering air had a dew point of −40°F and only 1 ppm. $CO_2$. The beds each comprised 1200 lbs. of calcium zeolite A. The system was fed at the rate of 8670 scfh of 38°F pretreated air, and product was extracted at the rate of 840 scfh. The system stabilized at a product purity of 75% oxygen, representing a recovery of 34.7% of contained oxygen. Although a depressed temperature zone was developed at the inlet end, it was not nearly as severe as in the Example III −V experiments wherein the feed air was not prepurified. In this experiment, the temperature dropped only to 23°F in the feed air inlet end (second foot of bed length), so that the temperature difference within the inlet end was only 15°F. This resulted in an oxygen recovery approaching that obtained under otherwise comparable conditions without pretreated air wherein the adsorbent bed is heated according to this invention.

Notwithstanding the foregoing, another test showed significant advantages in practicing this invention with pretreated air. The same system was fed with 8060 scfh. of pretreated air heated by indirect heat exchange with steam to 100°F. Since the ambient was 54°F, the added heat was 6900 BTU/hr. The product was withdrawn at a rate of 714 scfh. and comprised 90% oxygen. This resulted in an $O_2$ recovery of 38.1%.

It follows from Example VI that use of pretreated air improved performance of the adiabatic pressure swing adsorption system for air separation by reducing the severity of the inlet end temperature depression. However, practice of this invention additionally moved performance of the system to a higher range of oxygen recovery as generally depicted in FIG. 2.

It should also be noted that when the adsorbent beds used for air prepurification and air separation are placed in separate vessels but are joined by appropriate piping so that the two sections are integral from the process standpoint, this invention may be advantageously employed.

The present invention may also be practiced with two adsorbent beds, as for example described in Mc Combs U.S. Pat. No. 3,738,087, incorporated herein to the extent pertinent, and illustrated in FIGS. 7–8. In this type of process, the purged adsorption zone at the lowest pressure level is partially repressurized to an intermediate pressure by introducing oxygen gas. The process is characterized by an increasing pressure adsorption step of introducing feed air to the inlet end of the partially repressurized adsorption zone at pressure higher than said intermediate pressure, selectively adsorbing nitrogen and simultaneously discharging oxygen from the zone discharge end, with the feed gas introduction, the nitrogen adsorption and the oxygen discharge at relative rates such that the pressure of the adsorption zone rises from the intermediate pressure during this step to higher pressure at the end of such step.

Stated othwerwise, during the increasing pressure adsorption step the net molal rate of gas introduction to the adsorption zone is greater than the net molal rate of gas adsorption on the bed. In this relationship, "net molal rate of gas introduction" is the rate at which feed air is introduced minus the above-zero rate at which gas is discharged from the bed, and the "net molal rate of adsorption" is the rate at gas phase into the adsorbed phase minus the rate at which components of the feed are displaced or otherwise released from the adsorbed phase. When the net molal rate of gas introduction exceeds the net molal rate of gas adsorption, the adsorption pressure will rise. This may be accomplished by restricting the discharge of oxygen gas relative to the inflow of feed. The increasing pressure adsorption step preferably continues until the highest pressure level of the process has been attained and the nitrogen adsorption front has moved from the adsorption zone inlet end to a position intermediate the inlet and discharge ends. The location of the one component adsorption front is such that a substantial portion of the zone length downstream of the front is unused, i.e. not yet significantly loaded with the one component. The adsorption zone is thereafter cocurrently depressurized for sufficient duration to move the nitrogen adsorption front to the zone discharge end. During this period, oxygen is released from the zone and may be used to repressurize or purge another adsorption zone, and/or be discharged as product. In this manner, the adsorbent is fully utilized and maximum recovery of the less strongly adsorbed components is achieved at high purity.

Each step in the cycle of bed A will now be outlined and related to those components of FIG. 7 which are involved in the cycle changes. Pressures illustrative of such operation for air separation using calcium zeolite A adsorbent are included and are related to the following terms used herein to identify the terminal pressure in a relative sense:

| Term | Illustrative psig. |
| --- | --- |
| lowest pressure | <1 |
| lower intermediate pressure | 10 |
| equalization pressure | 20 |
| higher intermediate pressure | 32 |
| highest intermediate pressure | 35 |
| highest pressure | 40 |

Time 0–10: Bed A is being repressurized from the lowest process pressure (less than 1 psig.) to the equalization pressure (20 psig.), and bed B is being pressure equalized. Valves 15A and 16A are open and valves 17A and 18A are closed. Feed air is introduced to bed A at its inlet end from manifold 11 through valve 15A and one component-depleted gas from manifold 12 is simultaneously introduced at the bed A discharge end through valve 16A. The latter is derived from bed B undergoing pressure equalization through trim valve 19B, valve 16B, and flows consecutively through valves 16A and trim valve 19A into bed A. Bed B is cocurrently depressurized during this period and the flow continues for about 10 seconds until pressures between beds A and B are substantially equalized at about 20 psig. During this period, the flow of equalization gas is rapid while the flow of feed air from the compressor is limited, so that the major portion of the gas for repressurizing bed A from 1 to 20 psig. is one component-depleted gas, e.g. 85 % for air separation. During this period, another part of the gas released from bed B is discharged as product in manifold 12.

Time 10–30: Valve 16A is now closed and flow of feed air only continues to bed A for an additional 20 seconds to a higher intermediate pressure of about 32 psig. Simultaneously the bed B cocurrent depressurization continues and all of the nitrogen-depleted gas released therefrom is discharged as product in manifold 12. During this period the bed B pressure diminishes from 20 psig. (equalization) to 10 psig. (lower intermediate). During the bed B pressure equalization and cocurrent depressurization steps, the nitrogen adsorption front has moved progressively toward the bed discharge end, and at this point has reached the discharge end so that breakthrough is imminent. Therefore it can no longer deliver product purity gas to manifold 12 and valve 16B closes. In order for product flow to be uninterrupted, the product gas must be derived from bed A, and in this process the latter delivers product during the remainder of its repressurization.

Time 30–35: Valve 16A again opens and flow of product proceeds from bed A to manifold 12. This is the first part of the bed A increasing pressure adsorption step and the bed pressure rises from 32 psig. (higher intermediate) to 35 psig. (highest intermediate). Simultaneously valve 18B opens, waste discharge valve 25 closes and bed B is counter-currently depressurized through its inlet end to less than 1 psig., the lowest pressure of the process.

Time 35–60: During this remaining part of the bed A increasing pressure adsorption step wherein the bed pressure rises from 35 psig. (highest intermediate) to 40 psig. (highest), valves 17B and 25 are open and part of the nitrogen-depleted gas discharged from bed A flows through valves 23 and 24 and 17B to purge bed B.

At the beginning of the bed A 0–10 second repressurization through both the inlet and discharge ends, a nitrogen adsorption front is established near the inlet end. This front moves progressively toward the discharge end during the remainder of the 10 second period and during the succeeding repressurization steps for the first 60 seconds of the cycle. At the end of this period, a predetermined length of unloaded bed remains between the nitrogen adsorption front and the discharge end.

Time 60–70: Valve 15A closes and valve 16B is opened and bed A now commences pressure equalization with bed B while continuing to deliver product. Bed A is cocurrently depressurized by releasing gas from the discharge end. The gas flows through the unloaded bed length wherein the nitrogen component is adsorbed and the emerging nitrogen-depleted gas is employed in two parts. Oxygen product gas flows through control valve 21 in manifold 12 to the consumer conduit downstream valve 21 at a rate serving to hold the consumer conduit at a suitable low pressure such as 3 psig. The remainder and major part of the nitrogen-depleted gas flows through valves 16B and 19B to the discharge end of bed B for partial repressurization thereof. Bed B has previously been purged of nitrogen adsorbate and is initially at the lowest pressure level of the process. This flow of one component-depleted gas from bed A to bed B continues for about 10 seconds until the two beds are at substantially the same equalization pressure of 20 psig. During this step valve 15B is open and bed B is also being repressurized through its inlet end with feed air from manifold 11.

Time 70–90: Valve 16B closes and additional nitrogen-depleted gas is released from the bed A discharge end for cocurrent depressurization to about 10 psig. (lower intermediate), the entire quantity of this gas from bed A being discharged as product. Simultaneously only the feed air flow is continued to the bed B inlet end for further repressurization thereof from 20 psig. to 32 psig.

Time 90–95: Bed A is now counter-currently depressurized to the lowest process pressure by closing valves 15A, 16A, opening valve 18A and closing valve 25 so the nitrogen desorbate is released through waste manifold 14. Simultaneously valve 16B opens and nitrogen-depleted gas emerges from the bed B discharge end for flow through manifold 12 and valve 21 as product. This is the first part of the bed B increasing pressure adsorption step wherein the bed pressure rises from 32 to 35 psig. during nitrogen adsorption from feed air flowing through the bed.

Time 95–120: Valves 17A and 25 open and part of the nitrogen-depleted gas emerging from bed B is returned from manifold 12 through valves 23 and 24 to the bed A discharge end as purge gas. The latter flows through bed A countercurrently to the feed gas flow direction and desorbs the remaining nitrogen adsorbate. The resulting waste gas is discarded through valve 18A and manifold 14. Simultaneously with the bed A purging, the bed B increasing pressure adsorption step is continued until the bed pressure reaches 40 psig., the highest pressure of the process. At this point valves 17A and 18A are closed and purged bed A is again ready for repressurization in accordance with the foregoing sequence.

As previously stated, the crystalline zeolitic molecular sieves useful in the practice of this invention have an apparent pore size of at least 4 Angstrom units. Crystalline zeolites having apparent pore sizes of at least 4.6 Angstroms are preferred because they permit more rapid adsorption and desorption of the nitrogen molecules particularly in the lower temperature region, leading to faster operating cycles than attainable with small pore size zeolites.

The term apparent pore size as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

The term "zeolite," in general, refers to a group of naturally occurring and synthetic hydrated metal aluminosilicates, many of which are crystalline in structure. There are, however, significant differences between the various synthetic and natural materials in chemical composition crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to 2, or O/(Al+Si) =2. The negative electro-valence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. Any of this space not occupied by reduced element metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tabletted or pelletized for large scale adsorption uses. Pelletizing methods are known which are very satisfactory because the sorptive character of the zeolite, both with regard to selectivity and capacity, remains essentially unchanged.

Among the naturally occurring zeolitic molecular sieves suitable for use in the present invention include erionite, calcium-rich chabazite and faujasite. The natural materials are adequately described in the chemical art. Suitable synthetic crystalline zeolitic molecular sieves include types A, R, X, Y, L and T. Zeolites such as types X, Y, L and chabazite are particularly useful because of their relatively large pore sizes.

Zeolite A is a crystalline zeolitic molecular sieve which may be represented by the formula:

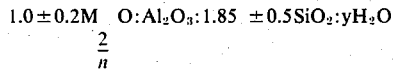

where $M$ represents a metal, $n$ is the valence of $M$, and $y$ may have any value up to about 6. The as-synthesized zeolite A contains primarily sodium ions and is designated sodium zeolite A. All of the monovalent cation forms of zeolite A have an apparent pore size of about 4 Angstroms, excepting the potassium form which has a pore size of about 3 Angstroms and consequently is unsuitable for use in the present invention. When at least about 40 percent of the monovalent cations sites are satisfied with di- or trivalent metal cations, zeolite A has an apparent pore size of about 5 Angstroms.

Zeolite R is described in U.S. Pat. No. 3,030,181.
Zeolite T has an apparent pore size of about 5 Angstroms, and is described in U.S. Pat. No. 2,950,952.
Zeolite X has an apparent pore size of about 10 Angstroms, and is described in U.S. Pat. No. 2,882,244.
Zeolite Y has an apparent pore size of about 10 Angstroms, and is described in U.S. Pat. No. 3,130,007.

Although preferred embodiments of the invention have been described in detail, it is contemplated that modifications of the process may be made and that some features may be employed without others, all within the spirit and scope of the invention.

What is claimed is:

1. In an adiabatic pressure swing process for air separation by selectively adsorbing at least nitrogen alternately in at least two crystalline zeolite molecular sieve adsorption beds of at least 4 Angstroms apparent pore size at ambient temperature by introducing feed air at temperatures less than 90°F to the inlet end of a first adsorption bed at high pressure, discharging at least 60% oxygen from the discharge end, concurrently depressurizing said first bed and terminating such cocurrent depressurization when the first bed is at lower pressure, returning part of the first bed gas from the cocurrent depressurization for repressurization of another adsorption bed, releasing waste gas from the first bed inlet end thereby countercurrently depressurizing same to said lowest pressure, introducing oxygen gas from another adsorption bed discharge end to the first bed discharge end as purge gas for desorption of the nitrogen adsorbate and discharging the adsorbate-containing purge gas from the first bed inlet of an other-than-first adsorption bed and at above said lowest pressure to the purged first bed for at least partial repressurization thereof, with the aforedescribed gas flows being such that the coldest gas temperature within the first bed inlet end is no warmer than 35°F and the temperature difference within the first bed is at least 15°F: the improvement comprising heating by an external source only the first bed inlet end sufficiently to maintain the gas flowing therethrough at maximum temperature of at least 20°F warmer than such gas without such heating but less than 175°F.

2. A process according to claim 1 wherein the first bed inlet end is heated sufficiently to maintain the gas flowing therethrough at maximum temperature between 100°F and 150°F.

3. A process according to claim 1 wherein calcium zeolite A is said zeolitic molecular sieve.

4. A process according to claim 1 wherein said first bed inlet end is heated by introducing said feed air at temperature above ambient.

5. A process according to claim 1 wherein said first bed inlet end is heated by introducing external heating means thereto.

6. A process according to claim 1 wherein said first bed inlet end is heated by externally heating oxygen gas discharged from another adsorption bed discharge end at above said lowest superatmospheric pressure and introducing the heated oxygen gas to the first bed inlet end for at least partial repressurization thereof.

7. A process according to claim 4 wherein the feed air is compressed to said highest superatmospheric pressure and thereby warmed by the heat of compression, and thereafter partially recooled prior to introduction to the first bed inlet end to remove only part of the compression heat.

8. A process according to claim 4 wherein the feed air is compressed to said highest superatmospheric pressure and thereby warmed by the heat of compression, the warm compressed air is separated into a first part and a second part, and one of said parts is recooled to remove the compression heat and mixed with the unrecooled part prior to introduction to the first bed inlet end.

9. A process according to claim 5 wherein the first bed inlet end is heated by electric resistance.

10. A process according to claim 5 wherein the first bed inlet end is heated by circulating an externally supplied heated fluid through enclosed passageway means.

11. A process according to claim 1 wherein at least part of said oxygen gas is introduced to the first bed inlet end for said repressurization.

12. A process according to claim 1 wherein the feed air contains atmospheric impurities and the same are selectively adsorbed in the first bed inlet end.

* * * * *